(12) United States Patent
Hagen et al.

(10) Patent No.: US 11,812,329 B2
(45) Date of Patent: Nov. 7, 2023

(54) DAMAGE DETECTION AND ORIGINATOR TRACKING

(71) Applicant: AUDI AG, Ingolstadt (DE)

(72) Inventors: Harald Hagen, Creussen (DE); Willi Wendt, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/802,847

(22) PCT Filed: Feb. 10, 2021

(86) PCT No.: PCT/EP2021/053233
§ 371 (c)(1),
(2) Date: Aug. 26, 2022

(87) PCT Pub. No.: WO2021/180410
PCT Pub. Date: Sep. 16, 2021

(65) Prior Publication Data
US 2023/0147115 A1 May 11, 2023

(30) Foreign Application Priority Data
Mar. 9, 2020 (DE) .......... 102020106238.9

(51) Int. Cl.
*H04W 4/021* (2018.01)
*H04W 4/40* (2018.01)
*H04N 23/661* (2023.01)
*H04N 23/695* (2023.01)

(52) U.S. Cl.
CPC .......... *H04W 4/021* (2013.01); *H04N 23/661* (2023.01); *H04N 23/695* (2023.01); *H04W 4/40* (2018.02)

(58) Field of Classification Search
CPC ....... H04W 4/40; H04W 4/021; H04W 4/027; H04N 23/695; G08B 13/19647; G08B 13/19695; G01S 5/04
See application file for complete search history.

(56) References Cited

U.S. PATENT DOCUMENTS 9,794,553 B2 * 10/2017 Shikii .................. B60R 25/305

FOREIGN PATENT DOCUMENTS

| DE | 10250952 A1 | 5/2004 | |
|---|---|---|---|
| DE | 10253192 A1 | 5/2004 | |
| DE | 102006012336 B4 | 10/2017 | |
| DE | 102017219818 A1 | 5/2019 | |
| DE | 102018206037 A1 | 10/2019 | |
| DE | 102018214654 A1 | 3/2020 | |
| WO | WO-2018186520 A1 * | 10/2018 | ........... G08B 21/182 |

OTHER PUBLICATIONS

Search Report, dated Dec. 18, 2020, in German Patent Application No. 102020106238.9 (5 pp.).
International Search Report, dated Apr. 26, 2021, in International Patent Application No. PCT/EP2021/052333 (15 pp.).
(Continued)

*Primary Examiner* — Boubacar Abdou Tchoussou
(74) *Attorney, Agent, or Firm* — STAAS & HALSEY LLP

(57) ABSTRACT

A method and a system detect damage caused to a parked vehicle and identify the originator of the damage.

20 Claims, 2 Drawing Sheets

(56) References Cited

OTHER PUBLICATIONS

International Preliminary Report on Patentability, dated Sep. 9, 2021, in International Patent Application No. PCT/EP2021/052333 (30 pp.).
PCT/EP2021/053233, filed Feb. 10, 2021, Harald Hagen et al., AUDI AG.
102020106238.9, filed Mar. 9, 2020, Harald Hagen et al., AUDI AG.

* cited by examiner

DAMAGE DETECTION AND ORIGINATOR TRACKING

CROSS REFERENCE TO RELATED APPLICATIONS

This application is a U.S. national stage of International Application No. PCT/EP2021/053233, filed on Feb. 10, 2021. The International Application claims the priority benefit of German Application No. 10 2020 106 238.9 filed on Mar. 9, 2020. Both the International Application and the German Application are incorporated by reference herein in their entirety.

BACKGROUND

Described below are a method and a system for detecting accidental damage to a parked vehicle and for identifying the originator of the damage.

In order to monitor a parked vehicle for parking collisions during the absence of the vehicle driver and, if appropriate, to inform the vehicle owner or fleet manager of damage, use is made of systems which detect parking collisions and notify the vehicle owner or fleet manager or an authorized addressee.

Vehicle vibrations and structure-borne sound events on body parts are detected using a central sensor or individual sensors which are fastened to vehicle outer parts. These structure-borne sound signals are evaluated and, depending on the severity, are classified as a damage event (scratch/impact/dent/buckling) and the absent vehicle driver or owner is informed using telematics. The environmental camera of the vehicle is activated with a time delay and the environment of the vehicle can be seen by the authorized user using remote access and/or a photograph or a video recording is automatically taken using the environmental camera or a dashcam.

The photographs of the environmental camera (for example 3D view) capture the entire vehicle environment only on a large scale. The originator of the damage cannot be determined and identified or can be determined and identified only with a large amount of effort. As a result of the time delay between the damage event and the starting of the camera, the originator, upon leaving the scene of an accident, is possibly no longer in the photograph and a person who is not involved is erroneously classified as the originator. This applies, in particular, in the case of fast minor damage and scratches (for example caused by shopping carts etc.). The large-scale dashcam recordings are therefore often only of little benefit. Permanent large-scale observation of the vehicle environment may not be permissible for reasons of data protection. However, accurate assignment to the damage event is legally absolutely necessary.

DE 10 2018 206 037 A1 relates to a tracking device to be carried by a road user and to a method for detecting a road user. In addition to a localization device and a motion sensor for sensing typical movements of road users, the tracking device contains a control unit which is configured to detect, on the basis of the sensor signals from the motion sensor, whether the tracking device is carried by a road user, and a transmitting/receiving apparatus for interchanging data with a system for detecting a road user that is installed in a vehicle. The system is used to avoid collisions between a vehicle and a road user.

DE 102 53 192 A1 teaches a method for avoiding collisions between a first road user and other road users and a mobile collision warning system configured for this purpose. In the method, road users determine their respective current spatial position and emit warning signals which represent their respective current spatial position. A first road user receives the warning signals from the other road users and predicts a potential collision on the basis of the position data.

SUMMARY

Against this background, described below are methods and devices which make it possible to automatically identify the originator of the damage.

Described below are a method in which, when damage to a parked motor vehicle is detected, at least two communication modules of the motor vehicle determine the positions of mobile communication devices in the environment of the motor vehicle by triangulation, capture their MAC addresses and track the trajectories of the mobile communication devices. The mobile communication device belonging to the originator of the damage is determined from the trajectories of the mobile communication devices, and a camera of the parked motor vehicle is used to make an image recording or video recording in the direction of the current position of the mobile communication device belonging to the originator.

The mobile communication devices in the environment of the motor vehicle must be capable of communicating with the communication modules of the motor vehicle. In one embodiment, the communication modules of the motor vehicle are WLAN modules. In another embodiment, the communication modules of the motor vehicle are Bluetooth modules. In yet another embodiment, the communication modules of the motor vehicle are mobile radio modules. In yet another embodiment, the communication modules of the motor vehicle are infrared modules.

The positions of the mobile communication devices in the environment of the parked motor vehicle are determined by at least two communication modules of the motor vehicle by triangulation. In one embodiment of the method, at least three communication modules of the motor vehicle are used. In a further embodiment of the method, use is made of four communication modules of the motor vehicle which are positioned as far away from one another as possible on the body of the motor vehicle, such as in the corners of the motor vehicle (for example under the headlights or taillights). A higher position resolution can be achieved when more than two communication modules are used for triangulation.

In one embodiment of the method, when damage to the parked motor vehicle is detected, at least one communication module of the motor vehicle emits an interference signal in order to switch mobile communication devices in the environment of the motor vehicle to a receiving mode and to change the mobile communication devices to a search mode, as a result of which the mobile communication devices in the environment of the motor vehicle become visible to the at least one communication module of the motor vehicle and are activated by the at least one communication module of the motor vehicle.

If the at least one communication module of the motor vehicle is a WLAN module, WLAN-enabled mobile communication devices in the environment of the motor vehicle, which are possibly already logged onto networks other than the WLAN of the parked motor vehicle, are switched to the receiving mode by the active interference signal. As a result of the subsequent search mode, the WLAN-enabled mobile communication devices switched to the receiving mode become visible to the at least one WLAN module of the parked motor vehicle and can be activated by the at least one WLAN module of the parked motor vehicle. As a result, the at least one WLAN module of the parked motor vehicle captures the MAC addresses of the WLAN-enabled mobile communication devices in the environment of the parked motor vehicle.

The MAC address (Media Access Control address) is the hardware address of the network adapter of a mobile communication apparatus that is used as the unique identifier of the apparatus in a computer network. Reference is also made to a physical address or apparatus address. In one embodiment of the method, the MAC address is compared with the IP address of the mobile communication device in order to determine the originator of the damage.

The positions of the mobile communication devices in the environment of the motor vehicle are determined by triangulation. The triangulation method is known, in principle, to a person skilled in the art. The communication modules emit a signal which is received and answered by the mobile communication devices in the environment of the motor vehicle. The positions of the mobile communication devices in the environment of the motor vehicle can then be calculated from the determined angles of the response signals and the known distance between the communication modules. In addition, the distances which can be determined by determining the propagation times of the signals between the communication module and the mobile communication device can be included in the calculation.

A trajectory can be determined for each of the captured mobile communication devices by repeatedly determining the position of each of the captured mobile communication devices. The trajectory represents the position of the respective mobile communication device on the basis of time ("movement profile").

The mobile communication device belonging to the originator of the damage can be determined from the positions of the mobile communication devices in the environment of the motor vehicle at the time at which the damage event is detected or at the time at which the respective mobile communication device is captured for the first time ("reference point") and the trajectories of the mobile communication devices. In this case, the mobile communication devices belonging to persons who are not involved in the damage are separated from the mobile communication device belonging to the originator of the damage.

In one embodiment of the method, zone attributes and movement profiles are used for this purpose. On that side of the motor vehicle on which damage has been detected, a zone is first defined around the position of the detected damage and is classified as an active damage zone. Those communication apparatuses whose initial position (reference point) is outside of the active damage zone (for example not on the relevant vehicle side) are rejected.

Those communication apparatuses whose initial position is inside of the active damage zone are classified on the basis of their movement profile. For example, the mobile communication apparatuses belonging to persons who are not involved and walk past the motor vehicle at a uniform speed are rejected. The trajectory of the originator of the damage can be identified by typical attributes, for example remaining at the position of the detected damage, a fleeing movement from the active damage zone, leaving the accident location with acceleration, etc.

After determining the mobile communication device belonging to the originator of the damage, a camera of the parked motor vehicle is used to make an image or video recording in the direction of the current position of the mobile communication device belonging to the originator. In one embodiment, the camera is an environmental camera of the parked motor vehicle. In another embodiment, the camera is a dashcam. In one embodiment of the method, the camera is focused on the current position of the mobile communication device belonging to the originator. In a further embodiment, the image section recorded by the camera is limited to an area corresponding to a vertical cylinder with a radius of 1 m around the current position of the mobile communication device belonging to the originator. This is intended to avoid other persons also being recorded by the camera in addition to the originator.

One aspect of the invention also relates to a motor vehicle having a device configured to carry out the method.

The device comprises means for detecting accidental damage. In one embodiment, the means for detecting accidental damage comprise means for detecting and evaluating vibrations of the motor vehicle and structure-borne sound events on body parts of the motor vehicle. In a further embodiment, the means for detecting accidental damage comprise at least one acceleration sensor. The evaluation means are configured to classify vibrations and structure-borne sound events as a damage event depending on the severity (scratch/impact/dent/buckling). Such systems for detecting accidental damage are known, in principle, to a person skilled in the art.

The device also comprises a central module which is configured to be activated by the means for detecting accidental damage and to receive data relating to the position of the detected damage. The central module is connected to at least two communication modules of the motor vehicle which may be WLAN modules, for example. In one embodiment, the central module is connected to more than two, for example three, four or six, communication modules which are arranged on the body of the motor vehicle. In one embodiment, four communication modules are arranged on the body of the motor vehicle such that they are at the greatest possible distance from one another, for example under the headlights and the taillights of the motor vehicle. This ensures that the entire surrounding area of the motor vehicle (360°) is captured.

In one embodiment, the communication modules are in the form of tracking modules and are connected to one another. The tracking modules are configured, possibly in interaction with the central unit, to determine the positions of mobile communication devices in the environment of the motor vehicle by triangulation and to capture changes in the determined positions in order to determine trajectories of the mobile communication devices.

The central module is configured to receive and process data from the communication modules, wherein the data comprise MAC addresses, positions and position changes of mobile communication devices in the environment of the motor vehicle.

The central module is also configured to have the at least one communication module of the motor vehicle emit an interference signal which switches mobile communication devices in the environment of the motor vehicle to a receiving mode and changes them to a search mode, and to have the mobile communication devices in the environment of the motor vehicle activated by the at least one communication module of the motor vehicle and to have their MAC addresses determined. In one embodiment, the central module is configured to determine the associated IP address from the determined MAC address of a mobile communication device in the environment of the motor vehicle. The determination of the MAC address and the comparison with the IP address allows the originator of the damage to be directly determined when leaving the scene of an accident.

The central module is also configured to identify the mobile communication device belonging to the originator of the damage using the data relating to the position of the detected damage, the MAC addresses, positions and position changes of the mobile communication devices in the environment of the motor vehicle.

The central module is also configured to control a camera of the motor vehicle and, after identifying the mobile communication device belonging to the originator of the damage, to orient the camera to a current position of the mobile communication device belonging to the originator and to have an image or video of the originator recorded.

The advantages of the method and of the presented device include the fact that they make it possible to assign detected damage to the originator and to identify the latter. Determining the position of the originator of the damage makes it possible to use image recording apparatuses in a targeted and legally compliant manner and the privacy rights of persons who are not involved are preserved.

Further advantages and configurations emerge from the description and the accompanying drawings.

The features mentioned above and the features yet to be explained below can be used not only in the respectively stated combination, but also in other combinations or alone, without departing from the scope of the present disclosure.

BRIEF DESCRIPTION OF THE DRAWINGS

The disclosure is schematically illustrated on the basis of embodiments in the drawings and is described further with reference to the drawings, in which.

DETAILED DESCRIPTION

Figure 1:
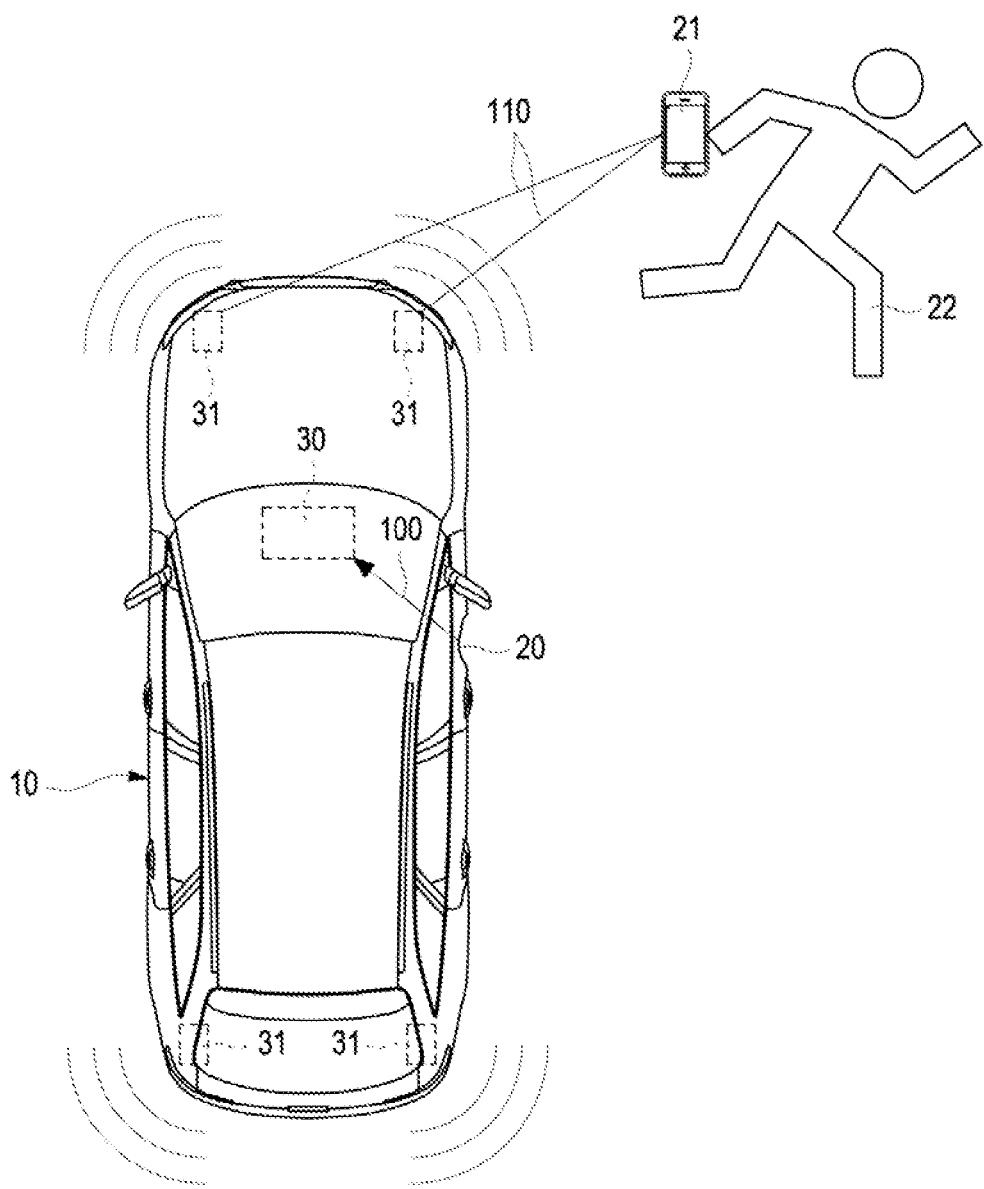
FIG. 1 shows an embodiment of a motor vehicle and an illustration of the method.

FIG. 1 shows a motor vehicle 10 having a central module 30 which has a bidirectional connection to four WLAN modules 31 which are arranged at the corners of the body of the motor vehicle 10. Damage 20 was caused on one side of the motor vehicle.

FIG. 1 also schematically illustrates the originator 22 of the damage 20 and a WLAN-enabled mobile communication device 21 (for example a smartphone or a tablet computer) belonging to the originator 22.

Exemplary method operations 100 and 110 are also symbolized in FIG. 1 for the purpose of illustrating the method.

In operation 100, the damage 20 is detected by evaluating the vibration of the motor vehicle 10 that is detected by sensors which are not illustrated in FIG. 1 or evaluating the structure-borne sound signals caused by the damage event, and the central module 30 and the WLAN modules 31 connected to the latter are activated.

In operation 110, the position of a mobile communication device 21 belonging to the originator 22 is determined by triangulation using the WLAN modules 31, and the trajectory of the mobile communication device 21 or of the originator 22 is recorded. Triangulation by the two front WLAN modules 31 of the vehicle 10 is depicted in FIG. 1. However, the triangulation can also be carried out by the two WLAN modules 31 on that side of the vehicle 10 on which the damage 20 is located or by three or all four WLAN modules 31 of the vehicle 10. The more WLAN modules 31 are used in the triangulation, the higher the position determination accuracy.

In addition, the MAC address of the WLAN-enabled mobile communication device 21 belonging to the originator 22 is determined using the WLAN modules 31 and is available for further evaluation.

Figure 2:
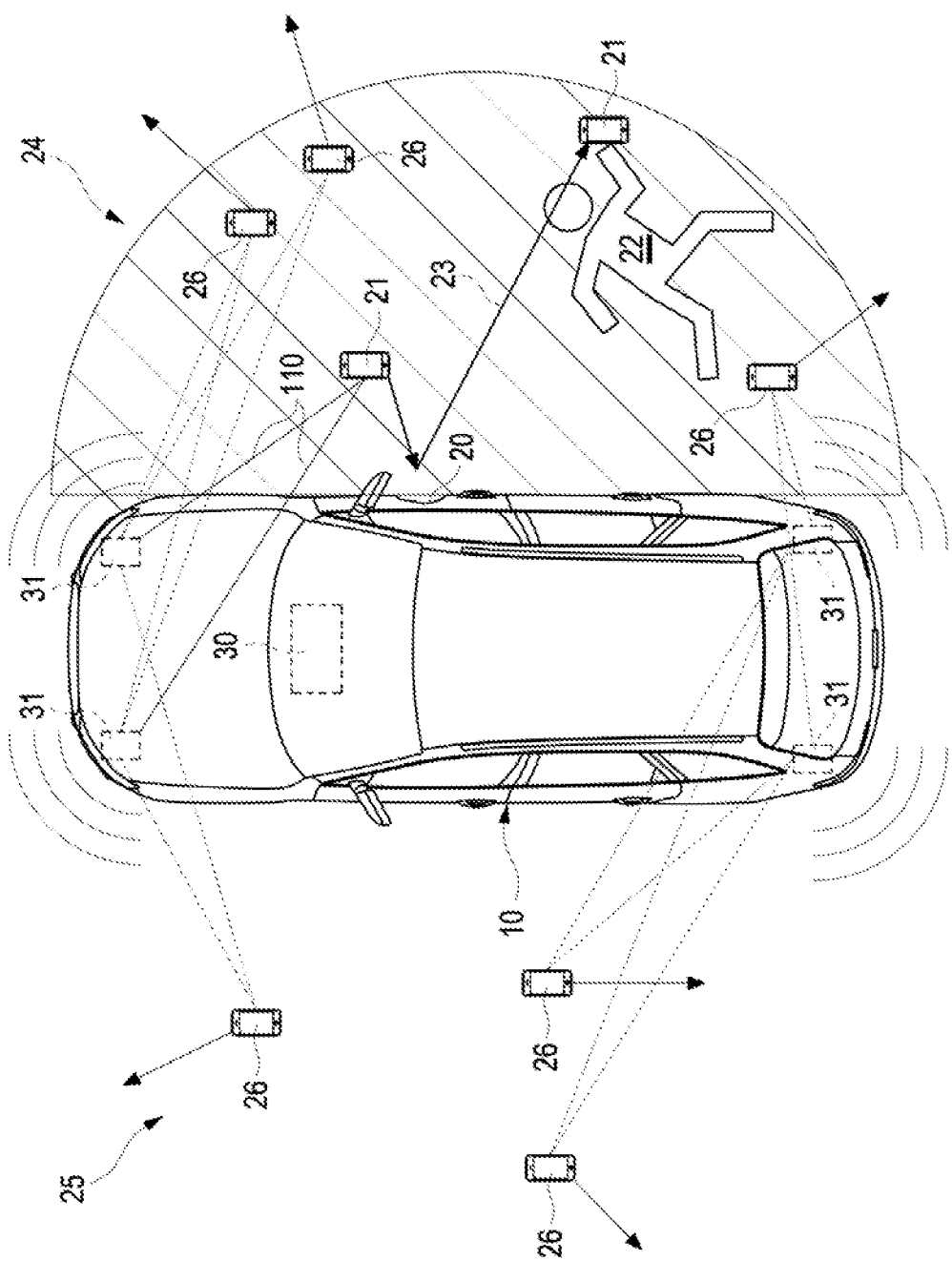
FIG. 2 shows the motor vehicle from FIG. 1 and a further illustration of the method.

FIG. 2 shows the motor vehicle 10 from FIG. 1 in an alternative scenario in which, in addition to a mobile communication device 21 belonging to the originator 22 of the damage 20, a plurality of mobile communication devices 26 belonging to persons who are not involved are also situated in the environment of the motor vehicle 10. As indicated in the FIG. 2 by dashed lines, the positions of the mobile communication devices 26 are also determined by triangulation and their trajectories (symbolized by arrows in FIG. 2) are recorded, which is referred to as tracking below. FIG. 2 also illustrates positions of the mobile communication device 21 belonging to the originator 22 at two different times and the trajectory 23 of the mobile communication device 21 between the positions.

When damage 20 is detected, a time stamp also containing the location of the damage 20 (for example door on the right) is generated and the accident evaluation and tracking are activated.

WLAN-enabled mobile communication devices 21, 26 in the environment of the motor vehicle 10 are triggered by the WLAN modules 31 and are exactly assigned to a position around the motor vehicle 10 by triangulation. Optionally, communication devices 21, 26 already logged onto a WLAN are set to on-call availability by a short interference signal.

The mobile communication devices 21, 26 in the receiving radius of the WLAN modules 31 are captured and their respective MAC address is stored. The calculations from the angles and routes of the available signals of identical MAC addresses result in a unique and evaluable data set:

MAC address 1—position (X1/Y1/Z1) with respect to the vehicle (reference point 1), MAC address 2—position (X2/Y2/Z2) with respect to the vehicle (reference point 2),

.
.
.

MAC address i—position (Xi/Yi/Zi) with respect to the vehicle (reference point i).

Repeatedly determining the positions of the mobile communication devices 21, 26 belonging to the MAC addresses 1 to i makes it possible to determine their trajectories. The trajectories represent the position of the respective mobile communication device 21, 26 on the basis of time.

The originator 22 in the environment of the motor vehicle 10 can therefore be identified from a multiplicity of MAC addresses and their position can be determined for recordings. For this purpose, the communication devices 26 belonging to persons who are not involved are separated from the communication device 21 belonging to the originator 22. Zone attributes 24, 25 and movement profiles are used for this purpose. An active damage zone 24 around the damage 20 is defined. Those communication apparatuses 26 whose initial position (reference point) is outside the active damage zone 24, that is in the irrelevant zone 25 (that is, not on the relevant vehicle side), are rejected. Those communication apparatuses 21, 26 whose initial position is inside the active damage zone 24 are classified on the basis of their movement profile. For example, persons walking past the motor vehicle 10 are rejected. The trajectory 23 of the originator 22 can be identified by typical attributes, for example remaining at the position of the damage 20, a fleeing movement, acceleration when leaving the accident location etc. The originator 22 of damage 20 will typically initially examine the damage 20 caused by them and analyze whether damage to the motor vehicle 10 is visible and will therefore remain in the immediate surroundings of the damage 20 for a certain time and will then move away. This often takes place hastily in order to avoid discovery. In contrast, persons who are not involved generally move past the motor vehicle 10 at a uniform speed.

This method makes it possible to determine and track the originator 22 of damage 20 and the MAC address of their mobile communication device 21 with a high degree of possibility. A comparison of the MAC address with the corresponding IP address can be used to determine the identity of the originator 22 and to identify the person in legal cases.

As soon as the mobile communication device 21 belonging to the originator 22 has been identified and their position has been determined, the environmental camera or a dashcam of the motor vehicle 10 can be used to make a recording of the originator 22 in a targeted and legally compliant manner without concomitantly capturing passersby who are not involved.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

LIST OF REFERENCE SIGNS

10 Parked vehicle
20 Damage
21 Mobile communication device belonging to the originator of the damage
22 Originator of the damage
23 Trajectory of the originator
24 Active damage zone
25 Irrelevant zone
26 Mobile communication device belonging to a person who is not involved
30 Central module
31 WLAN module
100 Damage detection
110 Triangulation

The invention claimed is:

1. A method, comprising:
when damage to a parked motor vehicle is detected,
determining, by at least two communication modules of the motor vehicle, positions of mobile communication devices in an environment of the motor vehicle by triangulation;
capturing Media Access Control (MAC) addresses of the mobile communication devices;
tracking respective trajectories of the mobile communication devices;
determining which mobile communication device of the mobile communication devices belongs to an originator of the damage; and
making, by a camera of the parked motor vehicle, an image recording or a video recording in a direction of a current position of the mobile communication device belonging to the originator.

2. The method as claimed in claim 1, wherein when damage to the parked motor vehicle is detected,
emitting, by at least one communication module of the at least two communication modules of the motor vehicle, an interference signal to switch the mobile communication devices in the environment of the motor vehicle to a receiving mode and to change the mobile communication devices in the environment of the motor vehicle to a search mode, as a result of which the mobile communication devices in the environment of the motor vehicle become visible to the at least one communication module of the motor vehicle and are activated by the at least one communication module of the motor vehicle.

3. The method as claimed in claim 2, wherein the at least two communication modules of the motor vehicle are wireless local area network (WLAN) modules.

4. The method as claimed in claim 2, wherein the determining which mobile communication device of the mobile communication devices belongs to an originator of the damage comprises determining the mobile communication device belonging to the originator of the damage from the positions of the mobile communication devices in the environment of the motor vehicle at a time at which the damage is detected and the trajectories of the mobile communication devices in the environment of the motor vehicle.

5. The method as claimed in claim 2, wherein the determining which mobile communication device of the mobile communication devices belongs to an originator of the damage comprises determining the mobile communication device belonging to the originator of the damage from the positions of the mobile communication devices in the environment of the motor vehicle at a time at which the positions of the mobile communication devices in the environment of the motor vehicle were first determined and their trajectories.

6. The method as claimed in claim 2, further comprising separating the mobile communication devices belonging to persons who are not involved in the damage from the mobile communication device belonging to the originator using zone attributes and movement profiles.

7. The method as claimed in claim 2, wherein the at least two communication modules comprise four communication modules of the motor vehicle used for triangulation.

8. The method as claimed in claim 1, wherein the at least two communication modules of the motor vehicle are wireless local area network (WLAN) modules.

9. The method as claimed in claim 8, wherein the at least two communication modules comprise four communication modules of the motor vehicle used for triangulation.

10. The method as claimed in claim 9, further comprising separating the mobile communication devices belonging to persons who are not involved in the damage from the mobile communication device belonging to the originator using zone attributes and movement profiles.

11. The method as claimed in claim 8, wherein the determining which mobile communication device of the mobile communication devices belongs to an originator of the damage comprises determining the mobile communication device belonging to the originator of the damage from the positions of the mobile communication devices in the environment of the motor vehicle at a time at which the damage is detected and the trajectories of the mobile communication devices in the environment of the motor vehicle.

12. The method as claimed in claim 8, wherein the determining which mobile communication device of the mobile communication devices belongs to an originator of the damage comprises determining the mobile communication device belonging to the originator of the damage from the positions of the mobile communication devices in the environment of the motor vehicle at a time at which the positions of the mobile communication devices in the environment of the motor vehicle were first determined and their trajectories.

13. The method as claimed in claim 8, further comprising separating the mobile communication devices belonging to persons who are not involved in the damage from the mobile communication device belonging to the originator using zone attributes and movement profiles.

14. The method as claimed in claim 1, wherein the determining which mobile communication device of the mobile communication devices belongs to an originator of the damage comprises determining the mobile communication device belonging to the originator of the damage from the positions of the mobile communication devices in the environment of the motor vehicle at a time at which the damage is detected and the trajectories of the mobile communication devices in the environment of the motor vehicle.

15. The method as claimed in claim 14, wherein the at least two communication modules of the motor vehicle are wireless local area network (WLAN) modules.

16. The method as claimed in claim 1, wherein the determining which mobile communication device of the mobile communication devices belongs to an originator of the damage comprises determining the mobile communication device belonging to the originator of the damage from the positions of the mobile communication devices in the environment of the motor vehicle at a time at which the positions of the mobile communication devices in the environment of the motor vehicle were first determined and their trajectories.

17. The method as claimed in claim 1, further comprising:
separating mobile communication devices belonging to persons who are not involved in the damage from the mobile communication device belonging to the originator using zone attributes and movement profiles.

18. The method as claimed in claim 1, wherein the at least two communication modules comprise four communication modules of the motor vehicle used for triangulation.

19. A motor vehicle comprising:
at least one sensor to detect accidental damage to the motor vehicle;
at least two communication modules comprising tracking modules, the at least two communication modules coupled to one another and configured to determine positions of mobile communication devices in the environment of the motor vehicle by triangulation and to capture changes in the determined positions to determine trajectories of the mobile communication devices; and
a central module in communication with the at least two communication modules, the central module configured to:
be activated by the at least one sensor to detect accidental damage and to receive data relating to the position of the detected accidental damage,
receive and process data from the at least two communication modules, which data comprise Media Access Control (MAC) addresses, positions and position changes of the mobile communication devices in the environment of the motor vehicle,
identify the mobile communication device belonging to the originator of the damage using the data relating to the position of the detected damage, the MAC addresses, positions and position changes of the mobile communication devices in the environment of the motor vehicle,
control a camera of the motor vehicle,
after identifying the mobile communication device belonging to the originator of the damage, orient the camera to a current position of the mobile communication device belonging to the originator, and
have an image or video of the originator recorded.

20. The motor vehicle as claimed in claim 19, wherein the central module is configured to have at least one communication module of the at least two communication modules of the motor vehicle emit an interference signal to switch the mobile communication devices in the environment of the motor vehicle to a receiving mode and to change the mobile communication devices in the environment of the motor vehicle to a search mode, and configured to have the mobile communication devices in the environment of the motor vehicle activated by the at least one communication module of the motor vehicle and to have the MAC addresses of the mobile communication devices determined.

* * * * *